(12) United States Patent
Xie et al.

(10) Patent No.: US 11,361,319 B2
(45) Date of Patent: Jun. 14, 2022

(54) SERVICE PROCESSING METHOD, APPARATUS, AND SYSTEM

(71) Applicant: TENCENT TECHNOLOGY (SHENZHEN) COMPANY LIMITED, Shenzhen (CN)

(72) Inventors: Xian Xie, Shenzhen (CN); Daogang Zhu, Shenzhen (CN); Jingliang Chen, Shenzhen (CN); Shan Lu, Shenzhen (CN); Jiatao Lin, Shenzhen (CN); Minghui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 428 days.

(21) Appl. No.: 16/039,859

(22) Filed: Jul. 19, 2018

(65) Prior Publication Data
US 2018/0322506 A1    Nov. 8, 2018

Related U.S. Application Data

(63) Continuation of application No. PCT/CN2017/075504, filed on Mar. 2, 2017.

(30) Foreign Application Priority Data

Mar. 22, 2016  (CN) .......................... 201610167643.4

(51) Int. Cl.
*G06Q 20/40*   (2012.01)
*G06K 7/10*    (2006.01)
(Continued)

(52) U.S. Cl.
CPC ..... *G06Q 20/40145* (2013.01); *G06K 7/1095* (2013.01); *G06Q 20/204* (2013.01); *G06Q 20/3226* (2013.01); *G06Q 20/40* (2013.01)

(58) Field of Classification Search
CPC ............. G06Q 20/40145; G06Q 20/40; G06Q 20/204; G06Q 20/3226; G06Q 20/386; G06K 7/1095; H04L 63/0861
See application file for complete search history.

(56) References Cited

U.S. PATENT DOCUMENTS 7,523,067 B1    4/2009 Nakajima
7,761,381 B1 *  7/2010 Fitch ...................... G06Q 20/40
                                                     705/44
(Continued)

FOREIGN PATENT DOCUMENTS

CN    102880955 A    1/2013
CN    103136663 A    6/2013
(Continued)

OTHER PUBLICATIONS

"An Introduction to Evaluating Biometric Systems", Mark Przybocki, Feb. 9, 2000, IEEE (Year: 2000).*

(Continued)

*Primary Examiner* — Neha Patel
*Assistant Examiner* — Duan Zhang
(74) *Attorney, Agent, or Firm* — Anova Law Group, PLLC

(57) ABSTRACT

Embodiments of the present disclosure provide a service processing method, apparatus, and system. The method may include: receiving, by a processing server, biological feature information of a user and service settlement information generated according to a service behavior of the user that are sent by a service device. The processing server searches for account information bounded with the biological feature information; performs payment processing on the account information according to the service settlement information, to obtain a processing result; and sends the processing result to the service device and a terminal.

19 Claims, 4 Drawing Sheets

(51) Int. Cl.
*G06Q 20/20* (2012.01)
*G06Q 20/32* (2012.01)

(56) References Cited

U.S. PATENT DOCUMENTS

| | | | | |
|---|---|---|---|---|
| 8,600,882 | B2* | 12/2013 | Summerrow | G06Q 20/28 705/39 |
| 9,519,901 | B1* | 12/2016 | Dorogusker | G06Q 20/202 |
| 10,163,105 | B1* | 12/2018 | Ziraknejad | G06Q 20/3274 |
| 2013/0088325 | A1* | 4/2013 | Choi | G06F 21/35 340/5.61 |
| 2013/0122863 | A1* | 5/2013 | Chen | H04W 12/065 455/411 |
| 2013/0262873 | A1* | 10/2013 | Read | H04W 12/06 713/186 |
| 2014/0363058 | A1* | 12/2014 | Emmett | G06F 21/32 382/117 |
| 2015/0120557 | A1* | 4/2015 | Zhang | G06Q 20/40145 705/44 |
| 2015/0150557 | A1* | 6/2015 | Tsai | A61F 2/0811 606/151 |
| 2015/0220931 | A1* | 8/2015 | Alsina | G06Q 20/12 705/44 |
| 2016/0042602 | A1* | 2/2016 | Phan | G07F 17/3237 463/29 |
| 2016/0196550 | A1* | 7/2016 | Chaudhry Basit | G06Q 20/363 705/41 |
| 2017/0011405 | A1* | 1/2017 | Pandey | G06F 3/03545 |
| 2017/0243215 | A1* | 8/2017 | Sifford | H04L 9/3236 |
| 2017/0270516 | A1* | 9/2017 | Jeong | H04L 63/0861 |

FOREIGN PATENT DOCUMENTS

| | | | |
|---|---|---|---|
| CN | 103942880 A | 7/2014 | |
| CN | 103985038 A | 8/2014 | |
| CN | 104463589 A | 3/2015 | |
| CN | 105186604 A | 12/2015 | |
| CN | 105844471 A | 8/2016 | |
| WO | WO-2017028270 A1 * | 2/2017 | G07B 15/04 |

OTHER PUBLICATIONS

The World Intellectual Property Organization (WIPO) International Search Report for PCT/CN2017/075504 dated May 3, 2017 5 Pages (including translation).
The State Intellectual Property Office of the People's Republic of China (SIPO) Office Action 1 for 201610167643.4 dated Jun. 25, 2018 8 Pages (including translation).

* cited by examiner

SERVICE PROCESSING METHOD, APPARATUS, AND SYSTEM

RELATED APPLICATION

This application claims priority to Chinese Patent Application No. 201610167643.4, filed on Mar. 22, 2016, and PCT Application No. PCT/CN2017/075504, filed on Mar. 2, 2017, entitled "SERVICE PROCESSING METHOD, APPARATUS, AND SYSTEM." Both applications are incorporated by reference in their entirety.

FIELD OF THE TECHNOLOGY

The present disclosure relates to the field of Internet technologies, specifically, to the technical field of service processing of biological features, and particularly, to a service processing method, a service processing apparatus, and a service processing system.

BACKGROUND OF THE DISCLOSURE

With the development of Internet technologies, service scenarios related to biological metrics, such as using fingerprint to unlock or to lock a lock, become increasingly common. In the example of unlocking a mechanism using fingerprints, the service process usually involves pre-storing fingerprint information of an authorized user; inputting fingerprint information when a user requests for unlocking or locking; comparing the fingerprint information with the pre-stored fingerprint information; performing an unlocking operation or a locking operation after it is determined that the requesting user is authorized. Therefore, in many service scenarios related to biological features, the emphasis of service processing is often on performing authentication based on a biological feature. However, in addition to implementations of existing authentication applications, in various service scenarios, user requirements also need to be more conveniently met. For example, when a user uses public transportation such as a metro or a bus, it would be convenient to quickly complete settlement and payment transactions without using various metro cards or bus cards but by using user fingerprint data. In another example, it would be convenient for a user to quickly settle a payment without using various bank cards but by using biological feature data in a shopping process. Such systems and methods would improve the efficiency of numerous services.

SUMMARY

Embodiments of the present disclosure provide a service processing method, apparatus, and system, to conveniently complete settlement and payment processing of a service behavior, thereby improving the efficiency and security of service processing.

According to one aspect of the present disclosure, an embodiment of the present disclosure provides a service processing method, applied to a service processing system. The service processing system includes a service device, a terminal, and a processing server. The method includes: receiving, by the processing server, biological feature information of a user and service settlement information generated according to a service behavior of the user that are sent by the service device. Further, the processing server searches for account information bounded with the biological feature information; performs payment processing on the account information according to the service settlement information, to obtain a processing result; and sends the processing result to the service device and the terminal.

According to another aspect of the present disclosure, an embodiment of the present disclosure provides a service processing apparatus, including a processing server, a service device and a terminal. The apparatus includes: an information receiving unit, a search unit, a payment processing unit, and a result feedback unit. The information receiving unit is configured to receive biological feature information of a user and service settlement information generated according to a service behavior of the user that are sent by the service device. The search unit is configured to search for account information bounded with the biological feature information. The payment processing unit is configured to perform payment processing on the account information according to the service settlement information, to obtain a processing result. The result feedback unit is configured to send the processing result to the service device and the terminal.

According to still another aspect of the present disclosure, an embodiment of the present disclosure provides a service processing system, including: a service device, a terminal, and a processing server, and the processing server may include the foregoing service processing apparatus.

In the embodiments of the present disclosure, the service device collects the biological feature information of the user, generates the service settlement information according to the service behavior of the user, and sends the biological feature information and the service settlement information to the processing server. The processing server searches for the account information bounded with the biological feature information of the user, and performs payment processing on the account information according to the service settlement information. Then, the processing server notifies the service device and the terminal of the processing result of the payment processing. In embodiments of the present disclosure, a seamless connection between the Internet, the biological feature information, and the service behavior is implemented by the interactions among the processing server, the service device, and the terminal.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following descriptions show merely some embodiments of the present disclosure, and persons of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by persons of ordinary skill in the art based on the embodiments of the present disclosure without creative effects shall fall within the protection scope of the present disclosure.

Figure 1:
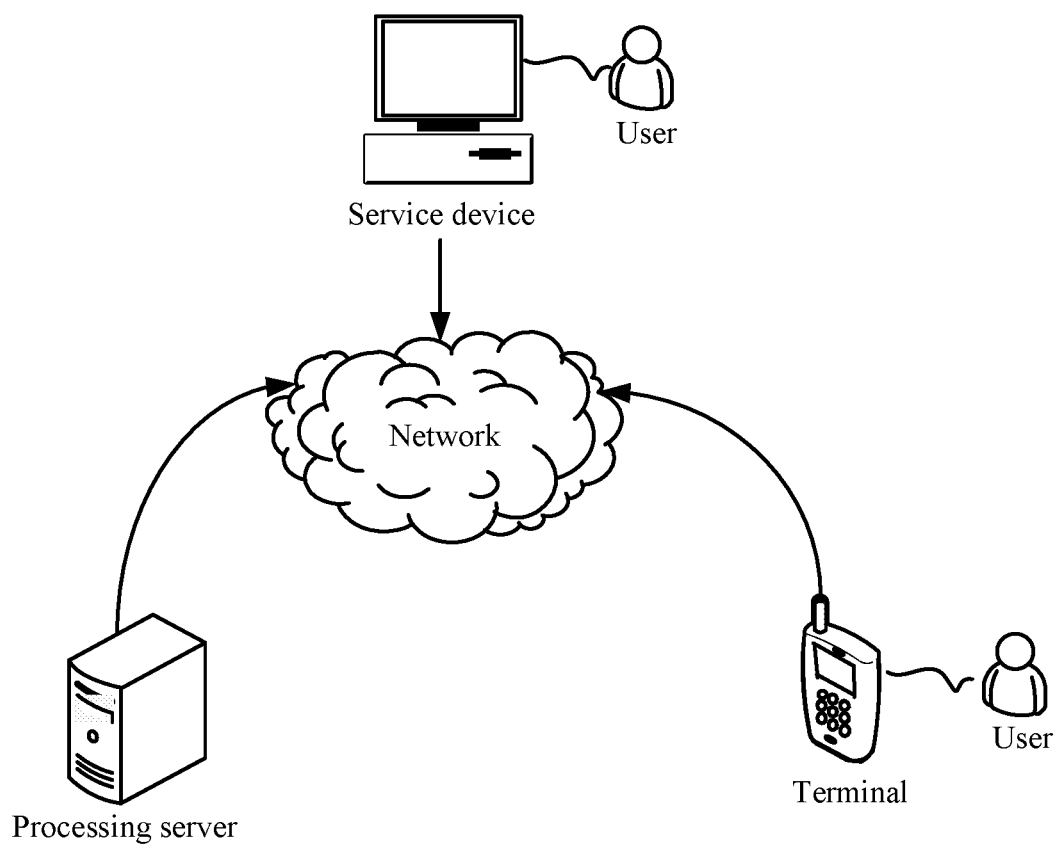
FIG. 1 is a schematic structural diagram of a service processing system according to an embodiment of the present disclosure.

An embodiment of the present disclosure discloses a service processing system. Referring to FIG. 1, the system may include: a processing server, a terminal, and a service device.

The service device is a device that can perform processes such as information recording, payment, and settlement based on a service behavior of a user. The service behavior herein may include, but is not limited to, an act to purchase a service and/or an act to purchase goods. The service consumption behavior may include, but is not limited to, a transport service consumption behavior generated by taking a transport vehicle such as a bus, a taxi, or a metro train, an act to purchase a service generated by using a service such as catering or housekeeping that is provided by a merchant, and the like. The shopping behavior may include, but is not limited to, a behavior of purchasing goods at a supermarket or other markets, and the like. The service device may be an independent device over the Internet, or may be a cluster device including a plurality of independent devices over the Internet. For example, the service device may be a metro service device, the service device may include devices such as a station gate and a settlement server, and the service device can perform recording and settlement processing on station entering information, station exiting information, and consumption information that are related in a process of using a metro transportation service by a user. In another example, the service device may be a market management device, the service device may include one or more cashier devices, and the service device can perform recording and settlement processing on purchase time, goods information, a consumption limit, and the like that are related to an act to purchase goods performed by a user at a market. The terminal may be a portable terminal device such as a mobile phone, a PAD (tablet computer), or an intelligent wearable device. An application program may be installed and run in the terminal. The application program may include, but is not limited to, a social networking service (SNS) application program, an instant messaging application program, a payment application program developed by a bank, UnionPay, or a third-party institution, and the like. The processing server may be an independent serving device in the Internet, or may be a cluster serving device including a plurality of independent serving devices in the Internet.

In this embodiment of the present disclosure, the service device may be connected to the processing server in a wired or wireless manner such as a cable, an optical fiber, or Wireless Fidelity (WiFi). The terminal may be connected to the processing server in a wireless manner such as a general packet radio service (GPRS) or WiFi. The processing server communicates with the service device and the terminal, to implement payment processing on a service behavior related to biological feature information of a user. Specifically, the service device collects biological feature information of a user, generates service settlement information according to a service behavior of the user, and sends the biological feature information and the service settlement information to the processing server. The processing server searches for account information bounded with the biological feature information of the user, and performs payment processing on the account information according to the service settlement information. Then, the processing server notifies the service device and the terminal of a processing result of the payment processing. In this embodiment of the present disclosure, a seamless connection between the Internet, the biological feature information, and the service behavior is implemented by means of interaction between the processing server, the service device, and the terminal. The biological feature information is input, so that settlement and payment processing of the service behavior can be conveniently completed, thereby improving the efficiency and security of service processing. It should be particularly noted that the biological feature information may include, but is not limited to, any one of facial feature information, fingerprint feature information, iris feature information, human gait feature information, and voice feature information. The account information may include, but is not limited to, any one of bank card information, credit card information, and third-party electronic account information.

Figure 2:
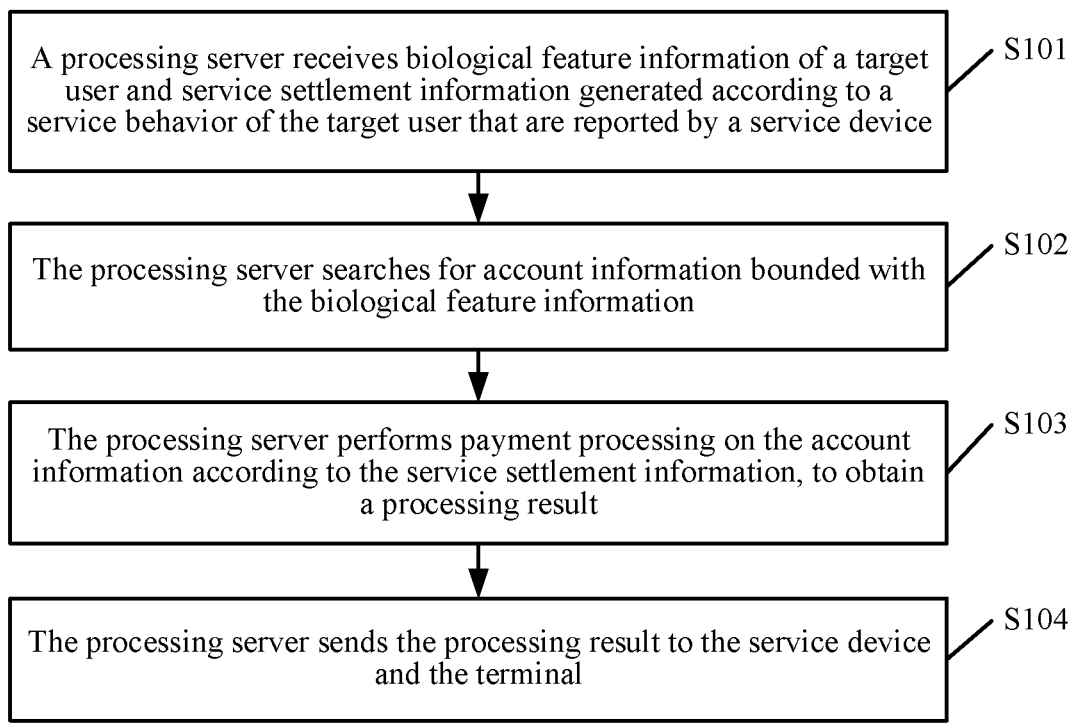
FIG. 2 is a flowchart of a service processing method according to an embodiment of the present disclosure.

Based on the foregoing descriptions, an embodiment of the present disclosure further discloses a service processing method. The method may be performed by the processing server shown in FIG. 1. Referring to FIG. 2, the service processing method may include the following step S101 to step S104.

S101: The processing server receives biological feature information of a user and service settlement information generated according to a service behavior of the user that are sent by the service device.

In this embodiment of the present disclosure, the service device has a biological feature collecting function, and can collect the biological feature information of the user. The service device has a service behavior recording function, and can record the service behavior of the user. The service device further has a service settlement function, and can calculate costs generated by the service behavior. For example, it is assumed that the service behavior is an act to purchase a service generated by taking a metro, and the service device is a metro operation device. The service device may collect fingerprint feature information of the user at an entrance station and an exit station, to record station entering information and station exiting information of the user, and can calculate costs needing to be paid by the user for the metro service consumption behavior this time. The service device sends, to the processing server, the collected biological feature information of the user and the service settlement information generated by means of calculation. It may be understood that the service settlement information may include: an identifier of a payer (the user), an identifier of a payee (a merchant to which the service device belongs), description information of the service behavior, and costs needing to be paid for the service behavior.

In this embodiment, before performing step S101, the processing server may further perform the following step S100:

S100: The processing server binds the biological feature information of the user with account information, and stores the biological feature information and the account information.

Binding the biological feature information with the account information and storing the biological feature information and the account information mean that the account information bond and stored with the biological feature information may be found by using the biological feature information, and similarly, the biological feature information bond and stored with the account information may be found by using the account information. During specific implementation, in a process of performing step S100, the processing server specifically performs the following step s11 to step s15:

s11: The processing server transmits a graphic code to the service device according to a preset cycle for displaying.

The preset cycle may be set according to an actual requirement, and may be, for example, 5 minutes, 10 minutes, or 50 seconds. The graphic code may include, but is not limited to, a one-dimensional code and a two-dimensional code. The two-dimensional code may include, but is not limited to, a quick response (QR) code, Code 49, portable document format (PDF) 417, and the like. The graphic code is used for triggering a binding and storage procedure. In addition, one preset cycle corresponds to one graphic code, and one graphic code corresponds to one unique service device. The processing server transmits the graphic code to the service device for displaying, and when any terminal scans the graphic code, the processing server can learn which terminal triggers the binding and storage procedure by using which service device at which time.

s12: The processing server sends a feature extraction instruction to the service device when detecting that the terminal scans the graphic code, so that the service device collects and uploads the biological feature information input by the user.

Before performing the service behavior, the user may use the terminal to scan the graphic code displayed on the service device, to initiate a binding and storage procedure. Specifically, the user may use a graphic code scanning tool in the terminal to scan the graphic code displayed on the service device. The graphic code scanning tool may be an independent scanning program in the terminal, for example, a two-dimensional code scanning application program installed in the terminal. The graphic code scanning tool may alternatively be a plug-in program in an application program already installed in the terminal, for example, a two-dimensional code scanning plug-in in an SNS application program or an instant messaging application program in the terminal. In step s12, when scanning the graphic code, the terminal sends a binding-and-storage triggering instruction to the processing server, so that the processing server learns which terminal triggers the binding and storage procedure by using which service device at which time. Further, the processing server sends the feature extraction instruction to the service device, where the feature extraction instruction is used for instructing the service device to collect and upload the biological feature information of the user. After receiving the feature extraction instruction delivered by the processing server, the service device may output prompt information to prompt the user to input the biological feature information, obtain the biological feature information input by the user, and report the biological feature information to the processing server.

s13: The processing server sends a verification code to the service device for displaying, so that the terminal receives the verification code entered by the user.

The verification code may be a character string including digits or letters and having a preset length. A role of the verification code is to prevent the account information of the user from being maliciously stolen, thereby ensuring the security of binding and storage. The processing server may randomly generate the verification code and sends the verification code to the service device for displaying. In addition, the service device may further output a prompt of a binding and storage procedure, to prompt the user to read the verification code from the service device and manually enter the verification code into the terminal.

s14: The processing server checks the entered verification code when receiving the verification code entered by the user and the account information of the user that are sent by the terminal.

The terminal obtains the verification code manually entered by the user, and sends both the verification code and the account information of the user to the processing server. It may be understood that in a feasible implementation, the terminal may pre-store the account information of the user, and after receiving the verification code manually entered by the user, extracts the account information from local storage space and submits both the account information and the received verification code to the processing server. In another feasible implementation, the terminal may alternatively prompt the user to input the account information in real time, and submits, to the processing server, both the received account information that is input in real time and the manually entered verification code. In step s14, after receiving the verification code and the account information that are sent by the terminal, the processing server checks the verification code. A check process includes: checking whether the reported verification code is totally the same as the verification code that is generated and delivered to the service device by the processing server. If the reported verification code is the same as the verification code that is generated and delivered to the service device by the processing server, the check succeeds; otherwise, the check fails.

s15: After the check succeeds, the processing server binds the biological feature information of the user with the account information, and stores the biological feature information and the account information.

The processing server may bind the biological feature information of the user with the account information and store the biological feature information and the account information in local storage space. It should be noted that in step s15, the processing server may add a same mark to the biological feature information of the user and the account information to binding of the two, and stores the biological feature information and the account information in the local storage space; or the processing server may store the biological feature information of the user and the account information in a same folder in the local storage space to bind and store the two; or the like. A manner of binding and storage is not limited in this embodiment of the present disclosure.

S102: The processing server searches for account information bounded with the biological feature information.

After receiving the biological feature information of the user and the service settlement information that are uploaded by the service device in step S101, the processing server searches local storage space. If the user has completed a binding and storage procedure by using step S100 (that is, step s11 to step s15), the processing server may find the account information bounded with the biological feature information. If the user has not completed a binding and storage procedure, in this embodiment, the processing server may output prompt information of binding and storage by using the terminal or the service device, to prompt the user to first return back to step S100 (that is, step s11 to step s15) to complete the binding and storage procedure and then perform the service behavior and a subsequent payment processing procedure.

In this embodiment, after performing step S102, the processing server may further perform the following step S200:

S200: The processing server performs authentication on the account information, and performs step S103 after the authentication succeeds.

To ensure to complete a payment processing procedure, after finding the account information, the processing server needs to first perform authentication on the account information, and if the authentication succeeds, perform step S103 and the subsequent payment processing. During specific implementation, in a process of performing step S200, the processing server specifically performs the following step s21 to step s23:

s21: The processing server determines whether a payment permission of the account information has been granted.

s22: The processing server searches whether a remaining resource limit of the account information is greater than a preset threshold if the payment permission has been granted.

s23: The processing server determines that the authentication succeeds if the remaining resource limit of the account information is greater than the preset threshold.

In step s21, whether the payment permission of the account information has been granted means: whether the user authorizes the account information to be used to pay corresponding costs for the service behavior. That is, if the payment permission of the account information is granted, it indicates that the account information may be used to pay costs for the service behavior of the user; or if the payment permission of the account information is not granted, it indicates that the account information cannot be used to pay costs for the service behavior of the user. In step s22, the preset threshold may be set according to an actual requirement. For example, for an act to purchase a service such as taking a bus or a metro, the preset threshold may be set to 10 RMB, 5 RMB, or the like. Alternatively, for a purchase behavior such as purchasing clothes or an electronic appliance, the preset threshold may be set to 100 RMB, 200 RMB, or the like. In step s22 and step s23, the processing server needs to search whether the account information has a relatively sufficient resource limit for subsequent payment processing. If the remaining resource limit of the account information is greater than the preset threshold, it indicates that the account information has a relatively sufficient resource limit for payment processing; or if the remaining resource limit of the account information is less than the preset threshold, it indicates that a resource limit of the account information is insufficient for payment processing.

S103: The processing server performs payment processing on the account information according to the service settlement information, to obtain a processing result.

A payment processing process herein may include: deducting, according to to-be-paid costs described by using the service settlement information, a corresponding limit of resource from an electronic account represented by the account information; and may further include: transferring the deducted corresponding limit of resource to a closed account identified by a payee. A payment result herein includes a payment success or a payment failure.

S104: The processing server sends the processing result to the service device and the terminal.

The service device may output the processing result to a merchant to which the service device belongs, and the terminal may output the processing result to the user.

In this embodiment, after performing step S104, the processing server may further perform the following step S300 and step S400:

S300: The processing server generates a service record of the user.

S400: The processing server transmits the service record of the user to the terminal or the service device when receiving a viewing request sent by the terminal or the service device.

In step S300 and step S400, the service record of the user may include information such as description information of the service behavior, performing time of the service behavior, and a payment result of the service behavior. The terminal may output the service record of the user, to help the user to view and check the service record. Similarly, the service device may output the service record of the user to help a merchant to view and check the service record.

The following describes in detail the procedure of the service processing method provided in this embodiment of the present disclosure by using a specific example. In the example, it is assumed that the biological feature information of the user is fingerprint feature information; the service behavior is a transport service consumption behavior generated by taking a metro from a station A to a station B; the service device is a metro operation device including a fingerprint collector of the station A, a gate at the station A that includes a fingerprint collection function, a gate at the station B that includes a fingerprint collection function, and a control apparatus; and the terminal is a mobile phone, and a third-party payment application program including a two-dimensional code scanning plug-in runs in the mobile phone. A service processing procedure in this embodiment of the present disclosure is as follows:

The processing server transmits a two-dimensional code to the fingerprint collector of the station A per 5 minutes for displaying. When the user uses the plug-in of the third-party payment application program in the mobile phone to scan the two-dimensional code, the mobile phone sends a binding-and-storage triggering instruction to the processing server, to trigger the processing server to send a feature extraction instruction to the fingerprint collector of the station A.

The fingerprint collector of the station A outputs prompt information to prompt the user to input the fingerprint feature information into the fingerprint collector of the station A. The fingerprint collector of the station A obtains the fingerprint feature information input by the user and uploads the fingerprint feature information to the processing server.

The processing server delivers a verification code to the fingerprint collector of the station A. The fingerprint collector of the station A displays the verification code and prompts the user to enter the verification code into the mobile phone to complete a binding and storage procedure. The user enters the verification code into the mobile phone. The mobile phone obtains, from local storage space, account information of the user in the third-party payment application program, and sends, to the processing server, both the account information and the verification code entered by the user. The processing server checks the verification code reported by the mobile phone, and if the check succeeds, binds the fingerprint feature information of the user that is uploaded by the fingerprint collector of the station A with the account information reported by the mobile phone and stores the fingerprint feature information and the account information.

The user arrives at the gate of the station A and inputs the fingerprint feature information, and the gate of the station A transmits, to the processing server, the fingerprint feature information input by the user. The processing server searches whether the fingerprint feature information of the user exists in the local storage space. If the fingerprint feature information of the user exists, the processing server instructs the gate of the station A to open, to allow the user to enter the station; searches for the account information bounded with the fingerprint feature information; performs authentication on the account information; and if the authentication succeeds, instructs the gate of the station A to open, to allow the user to enter the station, and instructs the control apparatus to record station entering information of the user.

After arriving at the station B, the user inputs the fingerprint feature information at the gate of the station B. The gate of the station B transmits, to the processing server, the fingerprint feature information input by the user. The processing server instructs the gate of the station B to open, to allow the user to exit the station, and instructs the control apparatus to record station exiting information of the user. The control apparatus calculates to-be-paid costs according to the station entering information and the station existing information of the user and generates service settlement information. The control apparatus sends the service settlement information to the processing server.

The processing server performs payment processing on the account information according to the service settlement information, to obtain a processing result, and sends the processing result to the control apparatus and the mobile phone. Further, the processing server may generate a service record of the user, and transmit the service record of the user to the mobile phone or the control apparatus when receiving a viewing request sent by the mobile phone or the control apparatus.

By means of the service processing method in this embodiment of the present disclosure, the service device collects the biological feature information of the user, generates the service settlement information according to the service behavior of the user, and sends the biological feature information and the service settlement information to the processing server. The processing server searches for the account information bounded with the biological feature information of the user, and performs payment processing on the account information according to the service settlement information. Then, the processing server notifies the service device and the terminal of the processing result of the payment processing. In this embodiment of the present disclosure, a seamless connection between the Internet, the biological feature information, and the service behavior is implemented by means of interaction between the processing server, the service device, and the terminal. The biological feature information is input, so that settlement and payment processing of the service behavior can be conveniently completed, thereby improving the efficiency and security of service processing.

Figure 3:
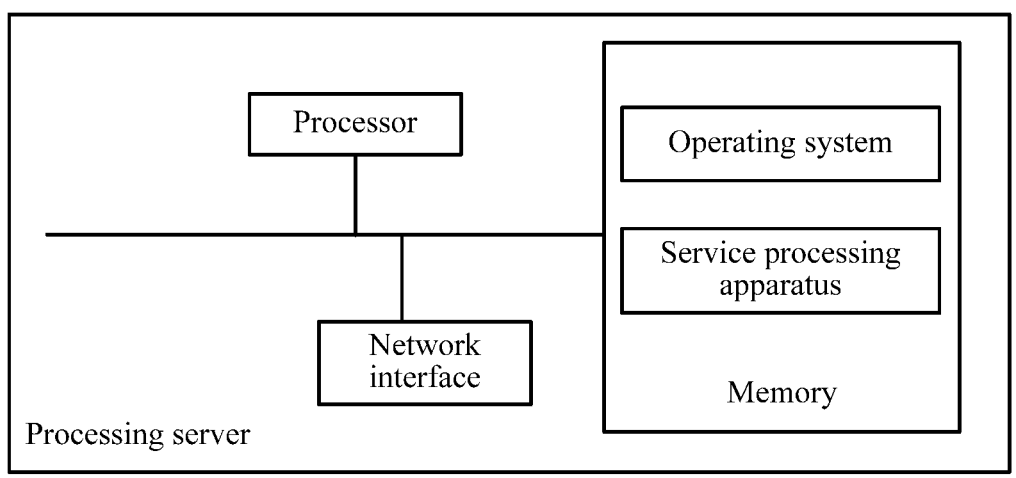
FIG. 3 is a schematic structural diagram of a processing server according to an embodiment of the present disclosure.

Based on the service processing system and the service processing method that are described in the foregoing embodiments, an embodiment of the present disclosure further provides a processing server. The processing server may be the processing server shown in FIG. 1, and may be configured to perform corresponding steps in the method procedure shown in FIG. 2. Referring to FIG. 3, an internal structure of the processing server may include, but is not limited to, a processor, a network interface, and a memory. The processor, the network interface, and the memory in the processing server may be connected by using a bus or in another manner. In FIG. 3 in this embodiment of the present disclosure, a bus connection is used as an example.

The processor (which may alternatively be referred to as a central processing unit (CPU)) is a computing core and a control core of the processing server. Optionally, the network interface may include a standard wired interface and a standard wireless interface (such as WiFi and a mobile communications interface). The memory is a memory device in the processing server, and is configured to store a program and data. It may be understood that the memory herein may be a high-speed random access memory (RAM), or may be a non-volatile memory, for example, at least one magnetic disk storage; or optionally, may be at least one storage apparatus located away from the processor. The memory provides storage space. The storage space stores an operating system of the server. The operating system may include, but is not limited to, a Windows system (an operating system), Linux (an operating system), and the like. This is not limited in the present disclosure. The storage space of the memory further stores a service processing apparatus. The processing server communicates with a service device and a terminal by running the service processing apparatus stored in the memory, to implement payment processing on a service behavior related to biological feature information of a user, and implement a seamless connection between the Internet, the biological feature information, and the service behavior. The biological feature information is input, so that settlement and payment processing of the service behavior can be conveniently completed, thereby improving the efficiency and security of service processing.

Figure 4:
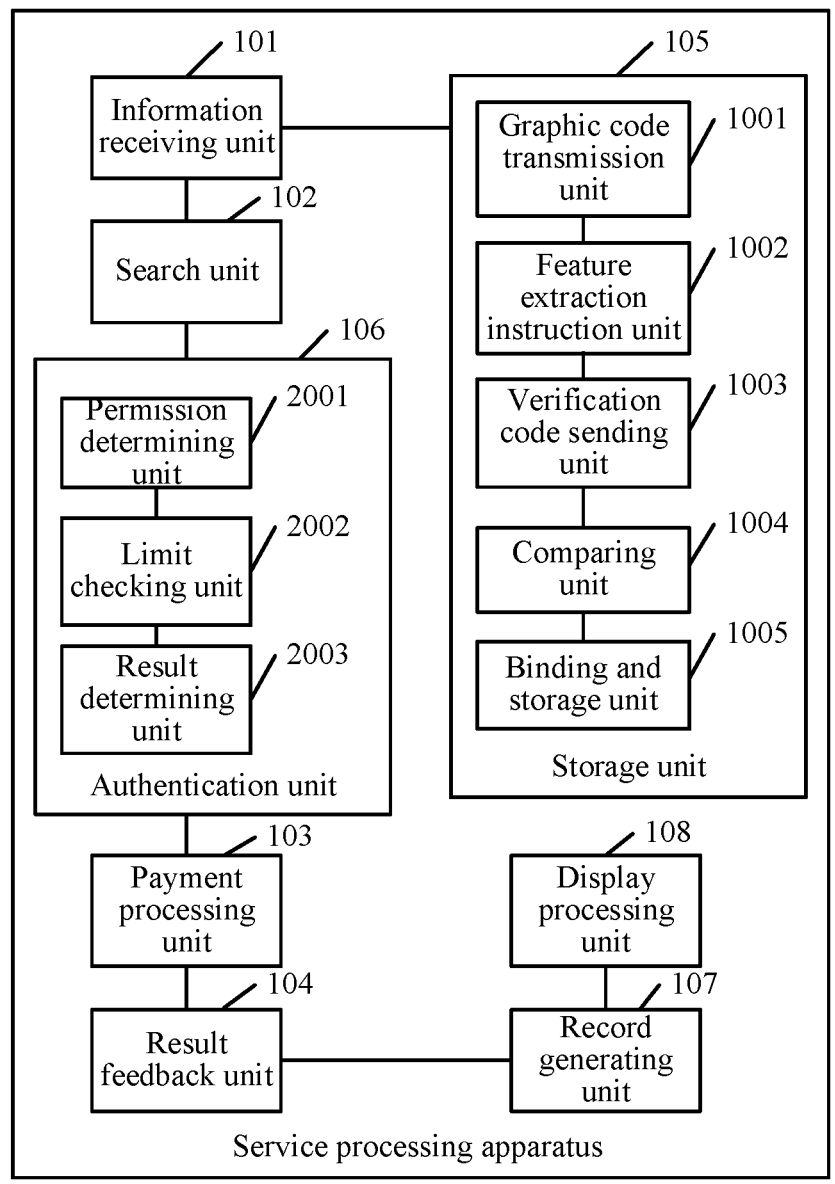
FIG. 4 is a schematic structural diagram of a service processing apparatus according to an embodiment of the present disclosure.

In this embodiment of the present disclosure, the processing server runs the service processing apparatus in the memory to perform the corresponding steps in the method procedure shown in FIG. 2. Referring to FIG. 4 together, in a service processing process, the apparatus runs the following units: an information receiving unit 101, configured to receive biological feature information of a user and service settlement information generated according to a service behavior of the user that are sent by the service device; a search unit 102, configured to search for account information bounded with the biological feature information; a payment processing unit 103, configured to perform payment processing on the account information according to the service settlement information, to obtain a processing result; and a result feedback unit 104, configured to send the processing result to the service device and the terminal.

During specific implementation, the service processing apparatus may further run the following unit: a storage unit 105, configured to: bind the biological feature information of the user with the account information, and store the biological feature information and the account information.

During specific implementation, in a process of running the storage unit 105, the apparatus specifically runs the following units: a graphic code transmission unit 1001, configured to transmit a graphic code to the service device according to a preset cycle for displaying; a feature extraction instruction unit 1002, configured to send a feature extraction instruction to the service device when it is detected that the terminal scans the graphic code, so that the service device collects and uploads the biological feature information input by the user; a verification code sending unit 1003, configured to send a verification code to the service device for displaying, so that the terminal receives the verification code entered by the user; a comparing unit 1004, configured to check the entered verification code when the verification code entered by the user and the account information of the user that are sent by the terminal are received; and a binding and storage unit 1005, configured to: after the check succeeds, bind the biological feature information of the user with the account information, and store the biological feature information and the account information.

During specific implementation, the service processing apparatus may further run the following unit: an authentication unit 106, configured to perform authentication on the account information, where the payment processing unit performs payment processing on the account information according to the service settlement information after the authentication succeeds, to obtain a processing result.

During specific implementation, in a process of running the authentication unit, the apparatus specifically runs the following units: a permission determining unit 2001, configured to determine whether a payment permission of the account information has been granted; a limit checking unit 2002, configured to search whether a remaining resource limit of the account information is greater than a preset threshold if the payment permission has been granted; and a result determining unit 2003, configured to determine that the authentication succeeds if the remaining resource limit of the account information is greater than the preset threshold.

During specific implementation, the biological feature information includes any one of facial feature information, fingerprint feature information, iris feature information, human gait feature information, and voice feature information. The service behavior includes: an act to purchase a service and/or an act to purchase goods.

During specific implementation, the service processing apparatus may further run the following units: a record generating unit 107, configured to generate a service record of the user; and a display processing unit 108, configured to transmit the service record of the user to the terminal or the service device when a viewing request sent by the terminal or the service device is received.

According to an embodiment of the present disclosure, the service processing method shown in FIG. 2 may be performed by the units in the service processing apparatus shown in FIG. 4. For example, steps S101, S102, S103, and S104 shown in FIG. 2 may be respectively performed by the information receiving unit 101, the search unit 102, the payment processing unit 103, and the result feedback unit 104 shown in FIG. 4. Steps S100, S200, S300, and S400 may be respectively performed by the storage unit 105, the authentication unit 106, the record generating unit 107, and the display processing unit 108 shown in FIG. 4. Step s11 to step 15 may be respectively performed by the graphic code transmission unit 1001, the feature extraction instruction unit 1002, the verification code sending unit 1003, the comparing unit 1004, and the binding and storage unit 1005 shown in FIG. 4. Step s21 to step s23 may be respectively performed by the permission determining unit 2001, the limit checking unit 2002, and the result determining unit 2003 shown in FIG. 4.

According to another embodiment of the present disclosure, the units in the service processing apparatus shown in FIG. 4 may be respectively or wholly integrated into one additional unit or a plurality of additional units. Alternatively, a unit (or multiple units) in the service processing apparatus may be further split into a plurality of units having smaller functions. This may implement same operations without affecting implementation of the technical effects of this embodiment of the present disclosure. The units are divided based on logical functions. In some embodiments, a function of one unit may be implemented by a plurality of units, or functions of a plurality of units may be implemented by one unit. In another embodiment of the present disclosure, a terminal device may further include another module. However, in some embodiments, these functions may alternatively be implemented by means of cooperation of another unit, and may be implemented by means of cooperation of a plurality of units.

According to other embodiments of the present disclosure, a computer program (including program code) that can perform the service processing method shown in FIG. 2 may run on a universal computing device, such as a computer, including a processing element and a storage element such as a CPU, a RAM, or a read-only memory (ROM), to construct the service processing apparatus shown in FIG. 4 and implement the service processing method according to the embodiments of the present disclosure. A unit of the service processing apparatus, such as the one shown in FIG. 4, can be implemented by one or more computer instructions stored in a computer memory. The computer program may be recorded in, for example, a computer-readable recording medium, and may be installed in the foregoing computing device by using the computer-readable recording medium and run in the computing device. A unit of the service processing apparatus, such as the one shown in FIG. 4, may also be implemented by a combination of computer instructions stored in a computer memory and related hardware components.

Similar to the method, by means of the processing server and the service processing apparatus in the embodiments of the present disclosure, the service device collects the biological feature information of the user, generates the service settlement information according to the service behavior of the user, and sends the biological feature information and the service settlement information to the processing server. The processing server searches for the account information bounded with the biological feature information of the user, and performs payment processing on the account information according to the service settlement information. Then, the processing server notifies the service device and the terminal of the processing result of the payment processing. In the embodiments of the present disclosure, a seamless connection between the Internet, the biological feature information, and the service behavior is implemented by means of interaction between the processing server, the service device, and the terminal. The biological feature information is input, so that settlement and payment processing of the service behavior can be conveniently completed, thereby improving the efficiency and security of service processing.

In the descriptions of this specification, such descriptions as referring to terms like "an embodiment", "some embodiments", "example", "specific example", or "some examples" mean that specific features, structures, materials or characteristics that are described with reference to the embodiments or the examples are contained in at least one embodiment or example of the present disclosure. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case without mutual contradiction, persons skilled in the art can combine or group different embodiments or examples that are described in this specification and features of the different embodiments or examples.

In addition, terms "first" and "second" are merely intended to describe objectives, and cannot be understood to indicate or imply relative importance or implicitly indicate the quantity of specified technical features. Therefore, a feature defined to be "first" or "second" may explicitly or implicitly include at least one of the features. In the descriptions of the present disclosure, "a plurality of" means at least two, for example, two or three, unless otherwise definitely and specifically limited.

Any process or method description in the flowchart or described in other manners may be understood as indicating to include one or more modules, segments, or parts of code that is used to implement steps of particular logical functions or processes and can execute instructions. In addition, the scope of the implementations of the present disclosure includes other implementations that may not be performed in the shown or discussed sequence, and the functions may be performed almost at the same time or in a reverse sequence according to related functions. This should be understood by persons skilled in the art to which the embodiments of the present disclosure belongs.

It should be understood that parts of the present disclosure may be implemented by using hardware, software, firmware, or combinations of them. In the foregoing implementations, a plurality of steps or methods may be implemented by using software or firmware that are stored in a memory and are executed by a proper instruction execution system. For example, if the plurality of steps or methods is implemented by software, which is the same as that in another implementation manner, any one or a combination of the following technologies that are known in the art may be used for implementation: a discrete logic circuit having a logic gate circuit configured to implement a logic function to a data signal, an application-specific integrated circuit having a proper combined logic gate circuit, a programmable gate array (PGA), a field programmable gate array (FPGA), or the like. In addition, the functional units in the embodiments of the present disclosure may be integrated into one processing module, or each of the units may exist alone physically, or two or more units may be integrated into one module. The integrated module may be implemented in a form of hardware, or may be implemented in a form of software functional modules. If implemented in the form of software functional modules and sold or used as an independent product, the integrated module may also be stored in a computer-readable storage medium.

Persons of ordinary skill in the art may understand that all or some of the procedures of the methods in the embodiments may be implemented by a computer program instructing relevant hardware. The program may be stored in a computer-readable storage medium. When the program runs, the procedures of the methods in the embodiments may be performed. The storage medium may be: a magnetic disk, an optical disc, a ROM, a RAM, or the like.

What is disclosed above is merely preferred embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A service processing method implemented by a processing server, comprising:
   transmitting, by the processing server, a graphic code to a first service device to be displayed according to a cycle, the graphic code being refreshed at each cycle, the first service device belonging to a merchant;
   receiving, by the processing server, a binding request from a terminal, the binding request being triggered upon the terminal scanning the graphic code using a graphic code scanning program, the binding request including an identification of the terminal and an identification of the first service device that displayed the graphic code;
   sending, by the processing server, a feature extraction instruction to the first service device to collect a first biological feature information entered by a user according to the identification of the first service device;
   receiving, by the processing server, the first biological feature information from the first service device;
   sending, by the processing server, a first verification code to the first service device to be displayed;
   prompting the user to read the first verification code displayed on the service device and manually enter the first verification code into the same terminal that scanned the displayed graphic code and sent the binding request according to the identification of the terminal;
   receiving, by the processing server, a second verification code entered at the terminal together with account information of the user transmitted by the terminal;
   comparing, by the processing server, the second verification code entered at the terminal and the first verification code sent to the first service device;
   binding and storing, by the processing server, the first biological feature information with account information of the user upon determining that the second verification code matches the first verification code;
   after binding and storing the first biological feature information with the account information of the user, receiving, by the processing server from a second service device belonging to a same merchant as the first service device, a second biological feature information collected by the second service device and service settlement information generated according to a service behavior;
   determining, by the processing server, that the second biological feature information matches the stored first biological feature information of the user;
   searching, by the processing server, for the account information of the user bound with the first biological feature information;
   performing, by the processing server, payment processing on the account information according to the service settlement information, to obtain a processing result; and
   sending, by the processing server, the processing result to the second service device and the terminal.

2. The service processing method according to claim 1, further comprising:
   performing, by the processing server, authentication on the account information, and after the authentication succeeds, performing payment processing on the account information according to the service settlement information; and
   obtaining, by the processing server, a processing result.

3. The service processing method according to claim 2, further comprising:
   determining, by the processing server, that a payment permission of the account information has been granted;
   searching, by the processing server among multiple thresholds preset for the user account according to types of a plurality of merchants, a threshold corresponding to the merchant;

determining that a remaining resource limit of the account information is greater than the threshold corresponding to the merchant if the payment permission has been granted; and determining, by the processing server, that the authentication succeeds if the remaining resource limit of the account information is greater than the threshold.

4. The service processing method according to claim 1, wherein the first biological feature information comprises any one of facial feature information, fingerprint feature information, iris feature information, human gait feature information, and voice feature information; and the service behavior comprises: an act to purchase a service or an act to purchase goods.

5. The service processing method according to claim 1, further comprising:

generating, by the processing server, a service record of the user; and transmitting, by the processing server, the service record of the user to the terminal or a third service device when receiving a viewing request sent by the terminal or the third service device.

6. The method according to claim 1, wherein:

the processing server is connected to a plurality of service devices; and the graphic code transmitted by the processing server is uniquely corresponded to the first service device.

7. The method according to claim 1, wherein:

the account information is prestored at a local storage space and extracted by the terminal in response to receiving the second verification code manually entered by the user.

8. The method according to claim 1, further comprising:

after finding the account information bound with the first biological feature information collected by the second service device, instructing, by the processing server, the second service device to open a gate.

9. The method according to claim 1, further comprising:

in response to determining that the second biological information does not match any stored biological information with bound account information, prompting a user to complete a binding and storage procedure.

10. The method according to claim 1, wherein: the account information is entered by the user in real time according to an input prompt on the terminal in response to receiving the second verification code manually entered by the user.

11. A processing server, comprising: a memory; and a processor coupled to the memory and configured to:

transmit a graphic code to a first service device to be displayed according to a cycle, the graphic code being refreshed at each cycle;

receive a binding request from a terminal, the binding request being triggered upon the terminal scanning the graphic code using a graphic code scanning program, the binding request including an identification of the terminal and an identification of the first service device that displayed the graphic code;

send a feature extraction instruction to the first service device to a first biological feature information entered by a user according to the identification of the first service device;

receive the first biological feature information from the first service device;

send a first verification code to the first service device to be displayed;

prompt the user to read the first verification code displayed on the service device and manually enter the first verification code into the same terminal that scanned the displayed graphic code and sent the binding request according to the identification of the terminal;

receive a second verification code entered at the terminal together with account information of the user transmitted by the terminal;

compare the second verification code entered at the terminal and the first verification code sent to the first service device;

bind and store the first biological feature information with account information of the user upon determining that the second verification code matches the first verification code;

after binding and storing the first biological feature information with the account information of the user, receive, from a second service device belonging to a same merchant as the first service device, a second biological feature information collected by the second service and service settlement information generated according to a service behavior;

determine that the second biological feature information matches the first biological feature information of the user;

search for the account information of the user bound with the first biological feature information;

perform payment processing based on the account information according to the service settlement information, to obtain a processing result; and send the processing result to the second service device and the terminal.

12. The processing server according to claim 11, wherein the processor is further configured to:

perform authentication on the account information, wherein the payment processing unit performs payment processing on the account information according to the service settlement information after the authentication succeeds, to obtain a processing result.

13. The processing server according to claim 12, wherein the processor is further configured to:

determine that a payment permission of the account information has been granted;

search, among multiple thresholds preset for the user account according to types of a plurality of merchants, a threshold corresponding to the merchant;

determine that a remaining resource limit of the account information is greater than the threshold corresponding to the merchant if the payment permission has been granted; and determine that the authentication succeeds if the remaining resource limit of the account information is greater than the threshold.

14. The processing server according to claim 8, wherein the first biological feature information comprises any one of facial feature information, fingerprint feature information, iris feature information, human gait feature information, and voice feature information; and the service behavior comprises: an act of purchasing a service or goods.

15. The processing server according to claim 8, wherein the processor is further configured to:

generate a service record of the user; and transmit the service record of the user to the terminal or a third service device when a viewing request sent by the terminal or the third service device is received.

16. A non-transitory computer-readable storage medium storing computer instructions that, when being executed by a processor, causing the processor to:
- transmit a graphic code to a first service device to be displayed according to a cycle, the graphic code being refreshed at each cycle, the first service device belonging to a merchant;
- receive a binding request from a terminal, the binding request being triggered upon the terminal scanning the graphic code using a graphic code scanning program, the binding request including an identification of the terminal and an identification of the first service device that displayed the graphic code;
- send a feature extraction instruction to the first service device to a first biological feature information entered by a user according to the identification of the first service device;
- receive the first biological feature information from the first service device;
- send a first verification code to the first service device to be displayed;
- prompt the user to read the first verification code displayed on the service device and manually enter the first verification code into the same terminal that scanned the displayed graphic code and sent the binding request according to the identification of the terminal;
- receive a second verification code entered at the terminal together with account information of the user transmitted by the terminal;
- compare the second verification code entered at the terminal and the first verification code sent to the first service device;
- bind and store the first biological feature information with account information of the user upon determining that the second verification code matches the first verification code;
- after binding and storing the first biological feature information with the account information of the user, receive, from a second service device belonging to a same merchant as the first service device, a second biological feature information collected by the second service device and service settlement information generated according to a service behavior;
- determine that the second biological feature information matches the first biological feature information of the user;
- search for the account information of the user bound with the first biological feature information;
- perform payment processing based on the account information according to the service settlement information, to obtain a processing result; and
- send the processing result to the second service device and the terminal.

17. The storage medium according to claim 16, wherein the computer instructions, when being executed by the processor further cause the processor to:
- perform authentication on the account information, wherein the payment processing unit performs payment processing on the account information according to the service settlement information after the authentication succeeds, to obtain a processing result.

18. The storage medium according to claim 17, wherein the computer instructions, when being executed by the processor further cause the processor to:
- determine that a payment permission of the account information has been granted;
- search, among multiple thresholds preset for the user account according to types of a plurality of merchants, a threshold corresponding to the merchant;
- determine that a remaining resource limit of the account information is greater than the threshold corresponding to the merchant if the payment permission has been granted; and
- determine that the authentication succeeds if the remaining resource limit of the account information is greater than the threshold.

19. The storage medium according to claim 16, wherein the first biological feature information comprises any one of facial feature information, fingerprint feature information, iris feature information, human gait feature information, and voice feature information; and
- the service behavior comprises: an act to purchase a service or an act to purchase goods.

* * * * *